2,861,690
PIPE LINE STRAINER

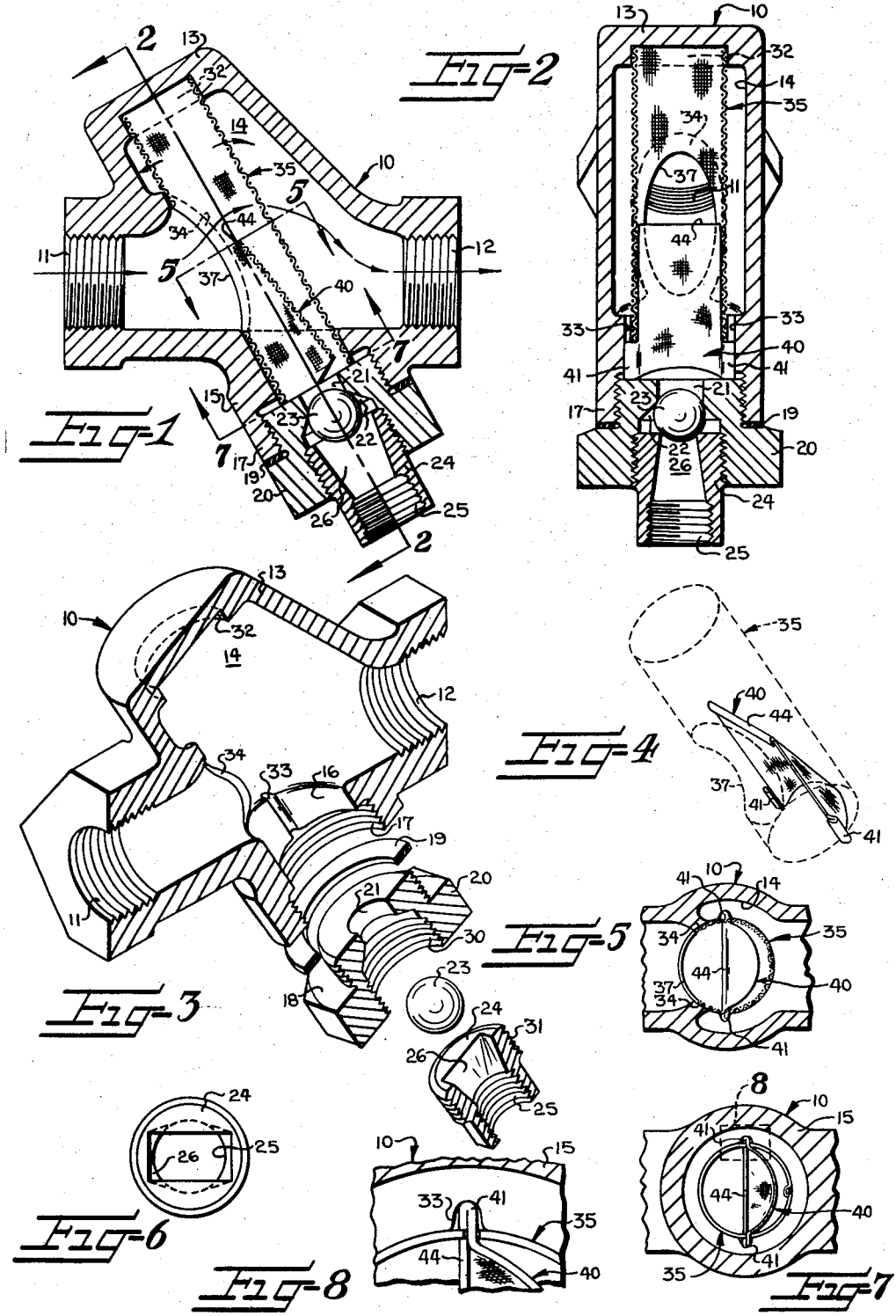

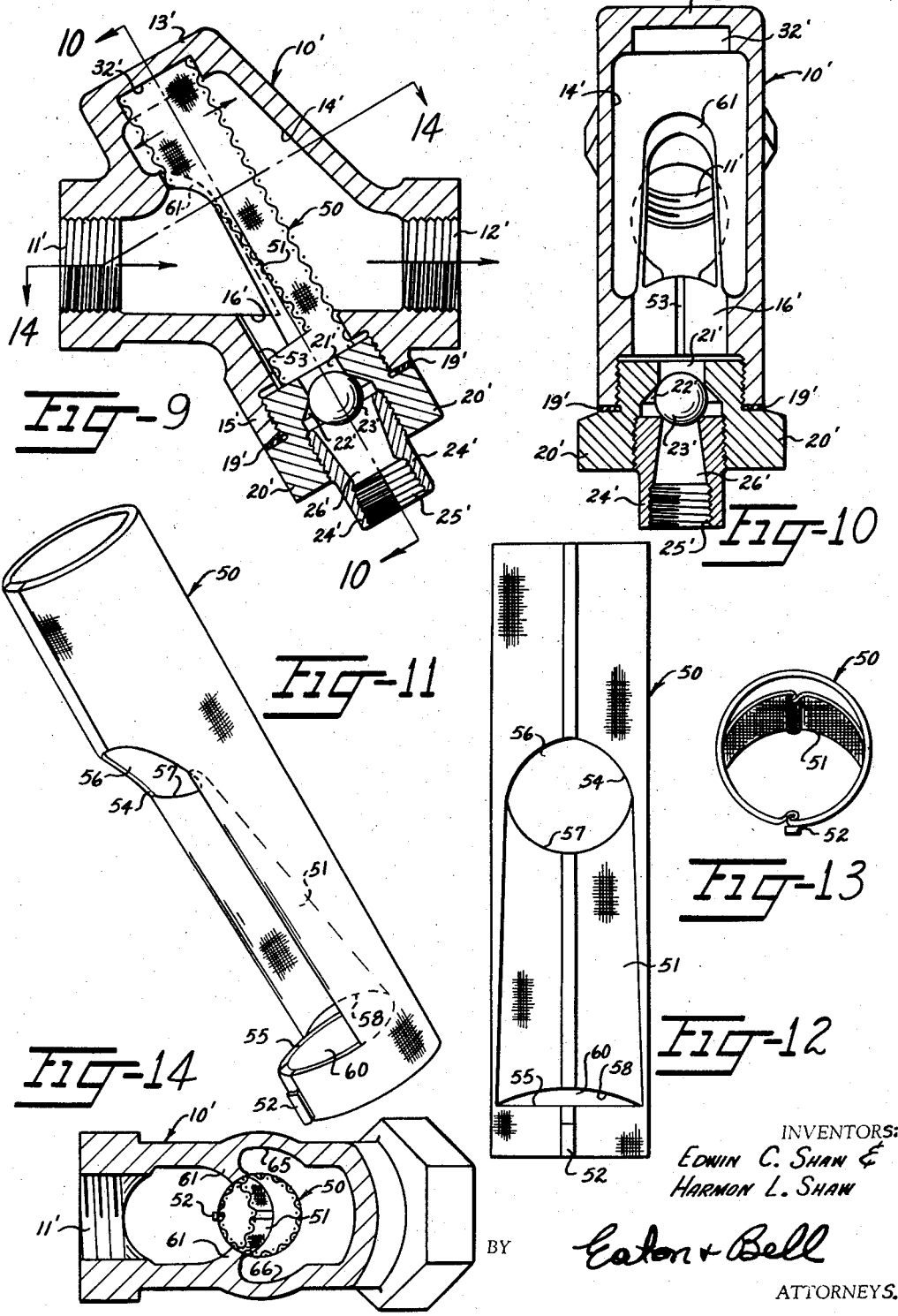

Edwin C. Shaw and Harmon L. Shaw, Charlotte, N. C., assignors to Perfecting Service Co., Charlotte, N. C., a corporation of North Carolina Continuation of abandoned application, Serial No. 357,802, May 27, 1953. This application January 9, 1957, Serial No. 633,344

5 Claims. (Cl. 210—306)

This invention relates to pipe line strainers and more especially, to an inline pipe strainer of the type to be mounted in a steam or water pipe line or the like, to trap any dirt, pipe scale or other foreign matter which may be in the water, steam, or other substance flowing through the pipe.

Heretofore, pipe strainers have been provided including a section of pipe having a hollow projection extending from one side thereof in which a tubular foraminated sleeve is positioned, the greater portion of the sleeve being disposed beneath the level of flow through the pipe line and the side of the section of pipe opposite the projection being restricted to form a seat for the accommodation of the sleeve. In this type of pipe strainer, the tubular sleeve extends from the pipe proper into said projection at an angle relative to the flow of fluid therethrough and, upon the lower portion of the tubular sleeve, opposite the pipe proper, becoming filled with sediment or foreign matter, the effective area of the flow chamber becomes restricted. Also, the hollow projection acts as a trap in a steam pipe and collects water through the condensation of steam, and upon the projection becoming filled with water, the flow of steam through the pipe line is correspondingly decreased. The accumulation of a substantial portion of water in the projection provided in strainers heretofore in use presents the additional disadvantage of unnecessarily increasing the danger of breaking the strainer in cold weather through freezing of the water trapped therein. Also, sediment will frequently accumulate in the strainer to such an extent as to constitute a block in the line.

In all types of inline pipe strainers, it is desirable that the flow of fluid in the same change direction in order to aid in the precipitation of sediment and the like thus enabling the same to be trapped by the tubular sleeve. In all prior installations, of which the applicant has any knowledge, this change of direction has been effected by forming a seat across the upper or inner portion of the strainer with the tubular foraminated sleeve extending downwardly therefrom at an angle to the direction of flow, and this seat in itself greatly restricts the area of flow through the strainer.

Also, to applicant's knowledge, pipe strainers heretofore in use have not been manufactured with a blow off valve integral therewith, and therefore considerable difficulty has been encountered in cleaning the strainers upon the tubular sleeve thereof becoming clogged with sediment or the like. It is frequently necessary to remove the sleeve from the line in order to properly clean the same unless a valve is subsequently installed in the strainer.

It is, therefore, the primary object of this invention to overcome the above-noted defects and others and to provide an improved pipe strainer wherein a maximum flow area is provided and maintained through the strainer, and which strainer may be readily cleaned.

It is another object of this invention to provide an improved inline pipe strainer wherein a foraminated tubular sleeve is positioned across the path of the flow of matter through the strainer so as to cause said matter to change its direction in passing through the strainer but wherein the maximum effective flow area within the strainer may be constantly maintained and is not reduced even upon sediment or the like accumulating in the foraminated sleeve of the strainer.

It is another object of this invention to provide a pipe strainer comprising a hollow body portion having an inlet opening and an outlet opening in opposite ends thereof, and said body portion also having an enlarged portion extending from each side thereof. A tubular screen or foraminated sleeve is positioned in said enlarged portions in such a manner as to extend across the interior of the body portion and means are provided in association with said foraminated sleeve for trapping dirt and analogous foreign matter in the fluid flowing through said pipe strainer.

It is another object of this invention to provide an improved pipe strainer of the type described wherein a removable plug is provided to facilitate insertion and removal of said foraminated sleeve and wherein said plug is constructed in such a manner as to have a blow-off valve formed integral therewith for cleaning out the pipe strainer.

It is another object of this invention to provide a pipe strainer wherein a tubular foraminated sleeve is utilized which is positioned at an angle relative to the line of flow through said pipe strainer and is provided with a foraminated or screen baffle in the lower portion thereof which extends substantially longitudinally of the sleeve, but at a slight angle relative to the longitudinal axis of said sleeve to thereby assist in entrapping dirt and the like in the lower portion of said strainer without decreasing the area of the strainer at said sleeve to less than the general flow area of the pipe.

This application is a continuation of application Serial Number 357,802, filed May 27, 1953.

Some of the objects of the invention having been stated, other objects will appear as the description proceeds, when taken in connection with the accompanying drawings in which—

Figure 1 is a vertical sectional view through a first form of the improved pipe strainer;

Figure 2 is a sectional view through the strainer taken along the line 2—2 in Figure 1 and showing the baffle in elevation;

Figure 3 is a somewhat schematic exploded sectional view of the strainer omitting the foraminated sleeve for purposes of clarity;

Figure 4 is a perspective view of the baffle and the foraminated sleeve removed from the strainer and showing the sleeve in phantom lines;

Figure 5 is a sectional plan view taken along the line 5—5 in Figure 1;

Figure 6 is a plan view looking down on the upper end of the valve seat formed in the closing plug;

Figure 7 is an enlarged inverted sectional plan view looking up along the line 7—7 in Figure 1;

Figure 8 is an enlarged detail of the area in dotted lines in Figure 7;

Figure 9 is a vertical sectional view through a second or modified form of the improved pipe strainer;

Figure 10 is a sectional view through the modified strainer taken along the line 10—10 in Figure 9, but omitting the sleeve;

Figure 11 is an isometric view of the second form of improved strainer sleeve removed from the strainer and showing the baffle integral therewith;

Figure 12 is a front elevation of the sleeve shown in Figure 11;

Figure 13 is an inverted plan view of the second form of baffle and sleeve removed from the strainer;

Figure 14 is a sectional plan view taken along the line 14—14 in Figure 9.

Referring more specifically to the drawings, the numeral 10 broadly designates the body or tubular housing of the improved strainer which is preferably cast from metal or other suitable rigid material and which is hollow and is provided with a threaded inlet opening 11 at one end and a threaded outlet opening 12 at the other end thereof. The inlet and outlet openings 11 and 12 are adapted to be communicatively connected to pipes through which fluid, such as gas, steam, water or the like may flow. It is frequently desirable to position the strainer in a pipe line just ahead of an instrument, such as a steam trap or the like, in order to trap any dirt or other foreign matter in the line and to prevent damage to such instrument.

The body 10 is provided with an enlarged portion or first substantially radial projection 13 which extends upwardly therefrom. The enlarged portion 13 has an irregularly-shaped cavity or chamber 14 therein. It will be observed that the cavity 14 extends toward the inlet opening at an angle relative to the line of flow between the inlet and outlet openings 11 and 12, and the projection 13 preferably also extends at such an angle, although the exterior configuration of the projection 13 is not important.

The cavity 14 communicates with the interior of the tubular housing 10, and the other, or lower side of the housing 10 is provided with a second enlarged portion or projection 15 which preferably extends downwardly in alinement with the cavity 14 and which has a cavity, chamber or bore 16 therein. The chambers 14 and 16 and the area therebetween comprise a screen chamber. The bore 16 within the projection 15 is substantially circular in plan and is of substantially smaller dimension than the cavity 14 within the enlarged portion 13. The bore 16 also extends at an angle relative to the line of flow between the inlet and outlet openings 11 and 12 and is substantially alined with the cavity 14. The lower end of the projection 15 has a threaded bore 17 for the reception of an adapter or strainer sleeve cap 20. The cap 20 has a shoulder 18 thereon adapted to receive a gasket 19, said gasket 19 being provided to effect a tight seal when the sleeve is secured in the body 10.

The sleeve cap 20 has a relatively small bore 21 therein adapted to communicate with the cavity 16 and an upper valve seat 22 is formed adjacent the bore 21 for reception of a blow-off valve in the form of a check ball 23 which is held in place by a valve stem or valve cap 24 having a bore 25 in its outer end and a rectangular tapered cavity 26 in the inner end thereof. The innermost end of the cavity 26 is rectangular in plan, the length of said rectangle being substantially greater than the diameter of the ball 23 and the width thereof being somewhat less so as to provide a lower seat for the ball 23. The cavity 26 tapers inwardly to communicate with the bore 25, and said bore 25 is preferably threaded for the reception, if desired, of a sediment discharge pipe, not shown.

The adapter or sleeve cap 20 is also provided with a threaded bore 30 communicating with the seat 22 and the bore 21, and the valve stem 24 is externally threaded, as at 31, to fit in the threaded bore 30. It is thus seen that the ball 23 is confined between the seats 22 and 26 upon the valve stem 24 being tightened in the threaded bore 30 of the adapter 20 and, by loosening the valve stem 24, the ball 23 may move out of engagement with the seat 22 to permit the flow of fluid or the like outwardly from the strainer through the adapter 20, the cavity 26 and the bore 25. This provides means for cleaning the pipe strainer and, also, facilitates the removal of the adapter 20 for gaining access to the interior of the pipe strainer for maintenance thereof.

It will be observed that the upper wall of the cavity 14 has a bore or circular recess 32 therein and the side walls of the bore 16 are provided with diametrically opposed key slots 33 which extend along the walls of the bore 16 so as to communicate with the threaded portion 17 and the cavity 14. The bores 16 and 32 and the slots 33 are provided for reception of a cleaning or a straining element in the form of a foraminated sleeve or screen broadly designated at 35. The sleeve 35 is preferably formed of non-corrosive mesh material such as wire screen or the like having small openings therethrough so that the sleeve 35 will trap any dirt or other foreign matter in the fluid flowing through the strainer. The upper end of the sleeve 35 seats in the bore 32 and the lower end of the sleeve 35 fits in the bore 16 in the projection 15.

It will be observed that the side of the sleeve 35 facing the inlet opening 11 is provided with a generally oval-shaped opening 37, said opening 37 serving to prevent the accumulation of sediment or other impurities on the exterior surface of the sleeve 35 by causing said sediment or impurities to flow into the interior of the sleeve 35 as the fluid flows through the strainer in the direction of the arrows in Figure 1. A continuous rib 34 projects inwardly around the wall of the cavity 14 adjacent the inlet opening 11, said rib 34 providing a seat around the opening 37 and serving to force the fluid within the pipe to flow into the sleeve 35 through the opening 37 by preventing lateral flow of the fluid around the opening 37.

Now, means are provided within the sleeve 35 for additionally entrapping and controlling the impurities, sediment or the like in the fluid flowing through the strainer, said means comprising a baffle designated at 40, the lower end portion of which is provided with ribs or key portions 41 which penetrate suitable slots provided therefor in opposite sides of the sleeve 35 and fit in the grooves or keyways 33 to prevent the sleeve 35 from turning within the strainer. The baffle 40 is also preferably formed of a foraminated or pervious mesh material such as non-corrosive screen wire or the like, and the body portion 42 thereof is substantially arcuate so as to substantially conform to the configuration of that portion of the sleeve 35 remote from the inlet opening 11.

As will be most clearly observed in Figure 1, the opposite side edges of the baffle 40 extend upwardly from the ribs 41 thereon in substantially parallel spaced relation to the wall of the tubular foraminated sleeve 35, and the body portion 42 of the baffle 40 tapers upwardly from the lower arcuate base thereof to join the opposite side edges of the baffle 40 at a point substantially midway of the oval-shaped opening 37 in the sleeve 35 to form a straight upper edge 44 on the baffle 40. It will be observed in Figure 4 that the upper edge 44 is reinforced by folding the foraminated material from which the baffle is formed back upon itself, and this doubled back portion is preferably secured to the body portion 42 as by solder or the like. The lowermost portion of the baffle 40 adjacent the outlet opening is spaced slightly above the lower end of the sleeve 35 so as to permit sediment to circulate within the sleeve 35, thus preventing an undue accumulation of sediment from building up within the baffle 40.

It will thus be observed that when the pipe strainer 10 is connected in a pipe line by means of the threaded openings 11 and 12, so that fluid, such as steam, water, or the like is caused to flow therethrough in the direction of the arrows in Figure 1, any sediment, impurities, or the like in said fluid will flow through the opening 37 in sleeve 35 and will impinge against the opposite wall of the sleeve 35 and fall down between said opposite wall and the baffle 40, or the dirt or the like will impinge against the baffle 40 and fall downwardly into the lower portion of the sleeve 35. It will be observed that the baffle 40 permits a portion of the fluid to pass therethrough and causes the remainder of the fluid to have to flow upwardly and over the baffle, thus changing its direction, which facilitates the precipitation of the sedimentary matter out of the fluid.

During continued operation of the strainer the accumulation of sediment, which has been precipitated from the fluid flowing through the strainer may build up within and around the baffle 40 to such an extent as to completely fill the lower half of the sleeve 35. In such an event, any additional impurities or the like will flow over the baffle 40 and will be trapped by the wall portion of the sleeve 35 adjacent the outlet opening until the area between the baffle 40 and said wall is filled with sediment. In this event, restriction of the flow of fluid through the pipe strainer does not occur due to the particular arrangement of the sleeve 35 within the strainer body 10.

It will be observed that, although the distance between the upper end of the baffle 40 and the nearest portion of the interior wall of the body 10 is slightly less than the diameter of the inlet and outlet openings 11 and 12, the width is such that the maximum effective flow through the inlet opening is in no way diminished upon the lower half of the sleeve 35 becoming filled with sediment. The fluid may flow outwardly in all directions through the upper portion of the sleeve 35. Thus, maximum flow is permitted through the strainer even after sediment has built up around the baffle 40.

Heretofore, in using pipe strainers, upon the strainer being partially filled with sediment, the area of flow therethrough would be restricted frequently obstructing the line completely. It was then necessary to open the strainer to remove the screen to clear the same.

Now, in accordance with the present invention, the strainer itself has a valve unit therein including the adaptor 20, the valve stem 24 and the ball 23. Thus, when it is desired to clean out the sleeve 35, the valve stem 24 may be loosened as described, and the flow of fluid through the strainer will force any accumulations of sediment out through the bore 25 into a suitable line or the like connected thereto, or a container positioned adjacent thereto.

*Modified or second form of strainer*

Referring now to Figures 9 through 14 there will be observed a second or modified form of the invention which differs from the first form of the invention, primarily, in that the baffle is formed integral with the foraminated sleeve. In all other respects, the modified form of the invention is substantially the same as the first form of the invention and like parts will bear like reference characters with the prime notation added.

In the modified form of the invention a foraminated sleeve 50 is substituted for the foraminated sleeve indicated at 35 in the first form of the invention, said sleeve 50 having a baffle 51 formed integral therewith. The sleeve 50 is positioned within the cavity 32' and the bore 16' in a manner similar to that heretofore described. It will be observed, however, that the diametrically opposed key portions, indicated at 41 in the first form of the invention, have been omitted from the present form and a single key portion 52 is provided on the lower portion of the sleeve 50 adjacent the inlet opening 11'. A suitable keyway or groove 53 is provided in the wall of the bore 16', said keyway 53 being adapted to receive the key portion 52 on the sleeve 50 to thereby prevent rotation of said sleeve 50 within the body 10'.

In order to form the baffle 51 integral with the sleeve 50, it will be observed in Figure 11 that the sleeve 50 is cut, as at 54 and as at 55. The line of cut 54 defines an opening 56 in the upper portion of the sleeve adjacent the inlet opening 11' and also defines the upper edge 57 of the baffle 51. The line of cut 55 adjacent the lower edge of the sleeve 50 defines the lower edge 58 of the baffle 51 and also defines an opening 60 in the sleeve 50. In order to form the baffle 51, the front portion of the sleeve 50 extending between the lines of cut 54 and 55 is forced inwardly to substantially an arcuate configuration in plan (Figures 11, 13 and 14).

A peripheral rib or flange 61 (Figure 10) extends inwardly from the body portion 10' and downwardly around the inlet opening 11', said rib or flange 61 being so shaped as to serve as a frame around the opening formed in the sleeve 50 and defined by the line of cut 54 and the formation of the baffle 51. The flange 61 insures that the steam or other matter flowing through the inlet opening 11 will impinge upon the baffle 51, or pass through the opening 56 in the sleeve 50, rather than flowing around the sleeve 50 and not passing through the same. Of course, a portion of the fluid is deflected upwardly as it enters the sleeve 50 to precipitate the dirt and the like in the fluid, in an identical manner to that described in the first form of the invention. This upward deflection of the fluid aids in precipitation of foreign matter from the substance flowing through the strainer and permits sediment and impurities to filter downwardly within the sleeve 50.

The opening 60 between the lower edge 58 of the baffle 51 and the wall of the sleeve 50 adjacent the outlet opening 11' permits sediment to accumulate and build up on both sides of the baffle 51, and as this accumulation of sediment builds upwardly around the baffle 51, the effective cross-sectional area of flow through the strainer is in no way diminished. This constant effective area of flow is effected by providing laterally extending or outwardly projecting side walls 65 and 66 on the body 10' adjacent the opening 56 in the sleeve 50. Thus, although the lineal distance between the top 57 of the baffle 51 and the flange 61 is less than the diameter of the inlet opening 11, the lateral distance between the inside surfaces of the body 10' compensates for the shorter lineal distance to thus provide a constant cross-sectional area of flow equal to the cross-sectional area of flow of the inlet pipe 11'.

If desired, the sleeves 35 or 50 may be substantially larger than shown and the ribs 37 and 61 reduced or altered accordingly. It is important, however, that the fluid be directed into the sleeve 35 or 50 and not around the same.

It is thus seen that there is provided an improved inline pipe strainer whereby foreign matter may be more effectively precipitated from fluid flowing through a pipe than has heretofore been possible, and that both forms of the improved strainer are so constructed as to enable said precipitation to take place without in any way diminishing the effective cross-sectional area of flow of the pipe in which the strainer is installed. It should also be observed that the unique construction of the present invention results in a more shallow lower projection or trap than has heretofore been possible, thus eliminating the disadvantage of water accumulating to such an extent as to hinder the flow of steam through the pipe, and also minimizing the danger of the strainer breaking due to the freezing of water trapped therein.

In the drawings and specification there has been set forth a preferred embodiment of the invention and although specific terms are employed, they are used in a generic and descriptive sense only, and not for purposes of limitation, the scope of the invention being defined in the claims.

We claim:

1. A pipe strainer comprising a hollow body portion provided with an inlet opening in one end thereof and an outlet opening in the other end thereof in alinement with said inlet opening, a first enlarged portion extending from one side of said body portion and having a cavity therein communicating with the interior of said body portion and extending at an angle therefrom toward the inlet opening, a second enlarged portion extending from the other side of the body portion and having an opening therethrough in line with the cavity in said first enlarged portion, a tubular foraminated sleeve removably positioned in said cavity and said opening and extending across the line of flow between said inlet and outlet opening, means for preventing rotation of said sleeve within said body, said sleeve having an opening therein adjacent said inlet opening, a rim on the inner surface of said body portion adapted to mate with said opening in said sleeve, a screen baffle position within said sleeve and the upper edge of said screen baffle extending across the opening in the sleeve.

2. A structure according to claim 1 wherein the screen baffle is formed integral with the foraminated sleeve.

3. A pipe strainer comprising a hollow body portion provided with an inlet opening in one end thereof and an outlet opening in the other end thereof in alinement with said inlet opening, a first enlarged portion extending from one side of said body portion and having a cavity therein communicating with the interior of said body portion and extending at an angle therefrom toward the inlet opening, a second enlarged portion extending from the other side of the body portion and having an opening therethrough in line with the cavity in said first enlarged portion, a tubular foraminated sleeve removably positioned in said cavity and said opening and extending across the line of flow between said inlet and outlet openings, means for preventing rotation of said sleeve within said body, said sleeve having an opening therein adjacent said inlet opening, a rim on the inner surface of said body portion adapted to mate with said opening in said sleeve, a baffle formed integral with said sleeve, the upper edge of said baffle extending across the opening in the sleeve, and means for inserting and removing said sleeve and cleaning the strainer.

4. A pipe strainer comprising a hollow body portion provided with an inlet opening in one end thereof and an outlet opening in the other end thereof in alinement with said inlet opening, a first enlarged central cavity extending from one side of said hollow body portion and communicating with the interior of said hollow body portion and extending at an angle therefrom toward the inlet opening, a second enlarged portion extending from the other side of the body portion and having an opening therethrough in line with the cavity in said first enlarged portion, a tubular foraminated sleeve removably positioned in said cavity and said opening and extending across the line of flow between said inlet and outlet opening, means for preventing rotation of said sleeve within said body, said sleeve having an opening therein adjacent said inlet opening, the inner surface of said body portion being adapted to mate with said opening in said sleeve, a screen baffle positioned within said sleeve and the upper edge of said screen baffle extending across the opening in the sleeve.

5. A structure according to claim 4 wherein the screen baffle is formed integral with the foraminated sleeve.

References Cited in the file of this patent
UNITED STATES PATENTS

| | | |
|---|---|---|
| 2,087,385 | Naujoks | July 20, 1937 |
| 2,399,994 | Feagin | May 7, 1946 |
| 2,661,096 | Tinker | Dec. 1, 1953 |